United States Patent
Shmueli

(10) Patent No.: US 10,448,217 B2
(45) Date of Patent: Oct. 15, 2019

(54) INTERACTIVE CHANNEL

(71) Applicant: Technion Research & Development Foundation Limited, Haifa (IL)

(72) Inventor: Oded Shmueli, Nofit (IL)

(73) Assignee: Technion Research & Development Foundation Limited, Haifa (IL)

( * ) Notice: Subject to any disclaimer, the term of this patent is extended or adjusted under 35 U.S.C. 154(b) by 321 days.

(21) Appl. No.: 14/485,999

(22) Filed: Sep. 15, 2014

(65) Prior Publication Data

US 2015/0082169 A1     Mar. 19, 2015

Related U.S. Application Data

(60) Provisional application No. 61/922,824, filed on Jan. 1, 2014, provisional application No. 61/877,995, filed on Sep. 15, 2013.

(51) Int. Cl.
*G06F 3/14* (2006.01)
*H04W 4/06* (2009.01)
*H04M 1/725* (2006.01)
*H04W 4/80* (2018.01)

(52) U.S. Cl.
CPC .......... *H04W 4/06* (2013.01); *H04M 1/72522* (2013.01); *H04W 4/80* (2018.02)

(58) Field of Classification Search
CPC ..................................... G06F 3/14; G06F 3/17
USPC ................ 715/716; 705/14.23, 14.53, 26.62; 345/159, 173; 382/181; 725/87; 709/204, 223
See application file for complete search history.

(56) References Cited

U.S. PATENT DOCUMENTS

| | | | |
|---|---|---|---|
| 6,628,928 B1 | 9/2003 | Crosby et al. | |
| 8,160,930 B2 | 4/2012 | Odinak et al. | |
| 2003/0229900 A1* | 12/2003 | Reisman | G06F 17/30873 725/87 |
| 2005/0251456 A1* | 11/2005 | Perkowski | G06Q 30/02 705/26.62 |
| 2007/0005385 A1* | 1/2007 | Deane | G06Q 10/06 709/204 |
| 2008/0002882 A1* | 1/2008 | Voloshynovskyy | G07D 7/0046 382/181 |
| 2013/0073388 A1* | 3/2013 | Heath | G06Q 50/01 705/14.53 |
| 2013/0212244 A1* | 8/2013 | Koponen | G06F 9/45558 709/223 |
| 2014/0006129 A1* | 1/2014 | Heath | G06Q 30/0222 705/14.23 |

FOREIGN PATENT DOCUMENTS

WO     WO 01/01331     1/2001

* cited by examiner

*Primary Examiner* — Ruay Ho

(57) ABSTRACT

A channel distribution system has a channel carrying content, and an interactive receiver which receives content and provides to a user. The interactive receiver has an interface to allow the user to interact with the content. The channel also includes a broadcast label superimposed on the content which invites the user to interact with the content. The label includes an interactive link with a digital instruction containing handling information for the interactive receiver device. The handling information tells the interactive receiver how to handle a user interaction coinciding with the label.

27 Claims, 5 Drawing Sheets

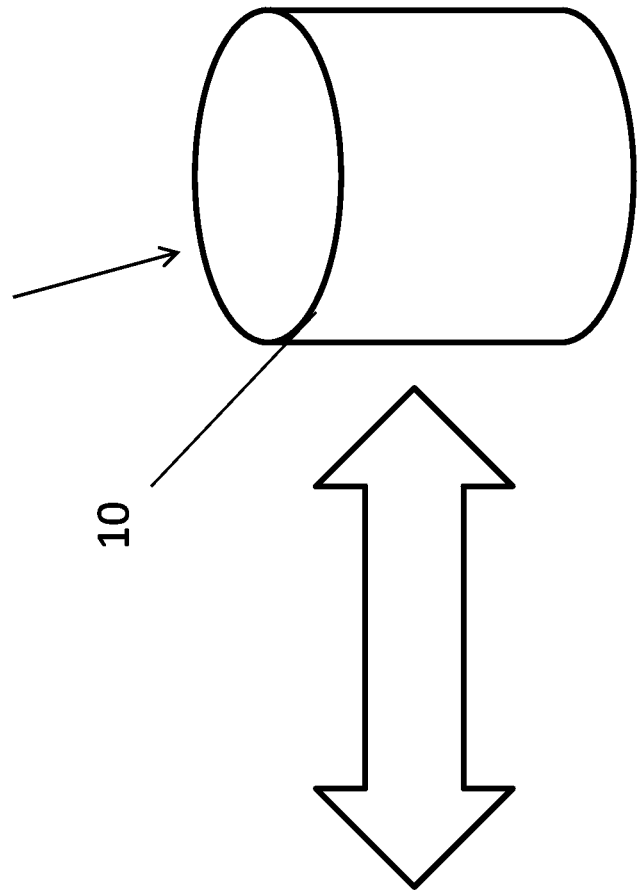
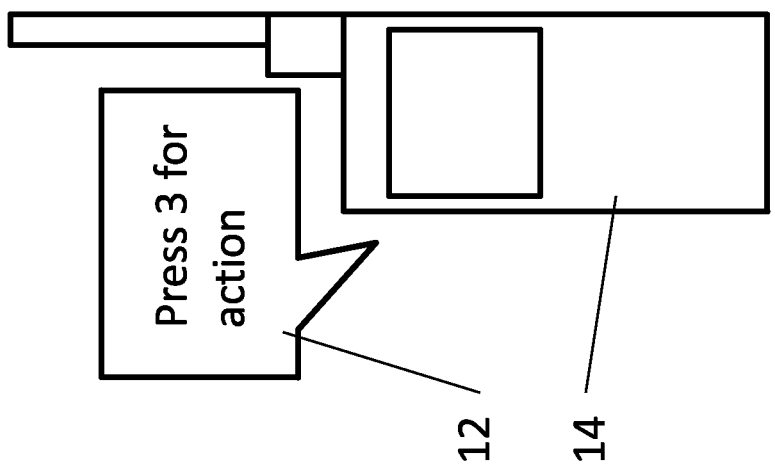
Fig. 1 Prior Art

INTERACTIVE CHANNEL

RELATED APPLICATIONS

This application claims the benefit of priority under 35 USC 119(e) of U.S. Provisional Patent Application Nos. 61/877,995 filed Sep. 15, 2013 and 61/922,824 filed Jan. 1, 2014. The contents of the above applications are incorporated herein by reference in their entirety.

FIELD AND BACKGROUND OF THE INVENTION

The present invention, in some embodiments thereof, relates to an interactive channel and a system and method for providing such a channel.

Radio receivers (RRs) are present at home, work, portable use, cars. RRs deliver music, news, radio programs on a variety of topics. They are easy to operate and present an almost standard interface in terms of user-controlled functionality [ranging from channel control, volume control, sound quality controls, mute button (sometimes coupled to a phone) and more].

Some RRs are based on broadcast (FM, AM (MW, LW, SW), DAB, HD, Satellite Radio etc.). Some are satellite based. Some are Internet based.

RRs are based on the idea of a channel that presents sound content that is continuously broadcast over the channel. The channel is physically realized as either broadcast on the airways via antennas, broadcast from a satellite, via Cable, Internet content that is generated on behalf of the channel and other known means. RRs may contain commercial portions or segments such as advertisements, public announcements, emergency notifications, health alerts and other segments that are not considered as ordinary channel content such as music, talk shows, and other radio programs.

Broadcast is typically one-to-many, so that changes in the channel would be applied to all of the viewers or listeners. On one-to-one systems it is possible to have interactive channels such as that shown in FIG. 1. Well known in telephony, an interactive system, typically hosted on a server 10 asks a user via an audio channel to select a key—speech bubble 12—and the key is used to select further flow of the channel via a communication device 14. The audio flow is changed at the server 10 in response to the user interaction. In a one-to many cases, such operation is impossible as all users would receive the program flow based on a single user's interaction.

U.S. Pat. No. 6,628,928 provides for multiple mobile units, each including a receiver for receiving radio broadcasts, a GPS system for determining the location of the vehicle, and a wireless transmitter for transmitting interactive radio control signals to a network operation center. While listening to a radio broadcast, the subscriber selects program segments of interest by pressing an interactive radio control button on the mobile unit. The program segments are, for example, individual musical selections, advertisements or the like. In response, the mobile unit transmits the carrier frequency of the radio broadcast, the date and time, the geographical location of the vehicle, and a subscriber identification signal to the network operation center using the wireless transmitter.

The network operations center determines the identity of the selected program segment based upon the information transmitted from the mobile unit. Then, the network operation center accesses databases providing information pertaining to the selected program segment and provides the information to the subscriber via the Internet, such that the information can later be retrieved by the subscriber using a home or office computer or the like. By providing feedback via the Internet, the subscriber need not make decisions immediately regarding purchase of goods or services while listening to a radio broadcast. Moreover, a vast amount of information may be provided to the subscriber facilitating the purchase of goods or services or the like.

International Patent Application Publication No. WO2001001331 discloses a technology that embeds identifiers in an audio segment (e.g. radio broadcast) and performs certain actions in response to a user reacting to that identifier.

If a user hears a song they want to record and keep, they press the Capture button while the song is playing. In response, the radio device decodes a watermark embedded in the music, and thereby knows the identity of the music. The radio then makes a wireless transmission identifying the user and the desired song. A local repeater network picks up the wireless signal and relays it (e.g., by wireless rebroadcast, by modem, or other communication medium) to a music clearinghouse. The clearinghouse charges the user a nominal fee (e.g., via a pre-arranged credit card), and queues the music for download to a predetermined location associated with the user.

The instruction may be entered by voice, GUI, etc., and dispatched from the appliance to the clearinghouse, which can then complete the transaction in accordance with pre-stored information (e.g., credit card account number, mailing address, etc.).

U.S. Pat. No. 8,160,930 discloses, in one example, a user in a vehicle listening to music, who wishes to request more information about the music, or wishes to purchase a CD of the playing music. In the example, the song "Candy" is playing on the radio. The display on a telematic control unit shows "Candy Everybody . . . " after related information is received from main system via the network and the gateway. The user can request more information, by either pressing a button or uttering a keyword or phrase. For example, the user says "song information". The microphone receives these words, after which telematic control unit digitizes the received words and delivers them to the main system for voice processing. Alternatively, the content may have already been downloaded and is simply played to the user. The telematic control unit either responds aurally and/or displays some relevant textual information that is received from the main system. The user can further request to purchase say a CD by either pressing a button or uttering a keyword. Once the user says "Purchase", the telematic control unit sends a request to the server via the network. The server processes the request to purchase the CD by contacting the CD production company using the user's financial service company to complete the transaction. The telematic control unit verbally responds or displays a confirmation, for example: "Your confirmation code is CM1234. The CD will be sent to your address on file".

In another example in the same patent, a user listens to an advertisement for a sandwich restaurant, the user can purchase a sub from the sandwich restaurant by either pressing a button or uttering a keyword, for example: "Buy jumbo club". The request is sent to the server via the Internet, and a telematic control unit responds or displays: "The nearest subway location is about 0.7 miles off exit 167 and has a drive-through. Would you like to buy your club sandwich at that location for $1.99?" The user can then purchase the sandwich, by either pressing a button or uttering "Purchase". Once the user selects to purchase the sandwich, a request is sent to the server via the network, which processes the request and returns an order number. The telematic control unit displays or responds: "Your order number is 57".

Broadcast radio stations, such as FM radio stations, may use a system known as a Radio Data System (RDS) or Radio Broadcast Data System (RBDS in US), both referred to herein as "RDS," to transmit supplemental information corresponding to their normal radio programming, e.g., music, talk, news, etc. In particular, RDS is intended for application to FM sound broadcasts between 87.5 MHz to 108.0 MHz. For stereophonic broadcast, the RDS subcarrier is locked to third harmonic of the 19 KHz pilot tone with overall tolerance of ±6 Hz. For monophonic broadcast, the RDS subcarrier is 57 KHz±6 Hz. The data message rate is constrained to 1.1875 Kbits/sec as defined in standards for RBDS (i.e., NRSC-4-A, National Radio Systems Committee (NRSC) jointly sponsored by Consumer Electronics Association (CEA) and National Association of Broadcasters (NAB)) and for RDS (i.e., IEC/CENELEC EN:62106:2001, International Electrotechnical Commission (IEC) and European Committee for Electrotechnical Standardization (CENELEC)).

Broadcast radio stations transmit their programming and the supplemental information in the RDS format as distinct signals multiplexed onto a single carrier. Radio receivers having RDS decoders, such as those included with some wireless communications devices or those in a vehicle, permit a user to listen to the transmitted programming and view the corresponding supplemental information on a display. Specifically, generally-known RDS improves functionality for FM receivers by providing basic RDS information such as Program Identification, Program Service, and Automatic tuning as well as Open Data Application (ODA) for such services as traffic message channel, emergency warning systems, radio text, and enhanced radio paging, etc.

Attempts have been made to extend RDS beyond providing a standard protocol for several types of supplemental information transmitted by the broadcast radio stations, such as the identity of the particular radio station, the type of programming, and text information such as the name of an artist and/or song. For example, some specifications provide additional messages that can control portions of the supplemental information, such as the display of the radio text information. In another example, some services have been developed to provide content to the receiver using a data connection, where the content is synchronized with the radio programming via the data message.

SUMMARY OF THE INVENTION

The present embodiments may provide a voice, or video, channel based device for data exploration and integration, and content channels, including video and voice channels, that allow for user interaction to modify the play, and provide sufficient flexibility to allow for last minute or real time adjustments to the interactivity provided. The present embodiments may provide world wide web style hotlinks to the world of streaming audio and video.

According to an aspect of some embodiments of the present invention there is provided a channel distribution system comprising:
a channel carrying content; and
an interactive receiver device for receiving the content and presenting to a user, the interactive receiver device comprising an interface for allowing a user to interact with the content;
wherein the channel further comprises a broadcast label superimposed on the content, the label inviting the user to interact with the content, the label being combined with an interactive link, the interactive link comprising a digital instruction to the interactive receiver device, the digital instruction containing operating information to operate the interactive receiver device in response to a user interaction coinciding with the label, the operating being combined with continuing content play.

In an embodiment, silent periods are added to a channel for subsequent addition of content to the respective channel.

In an embodiment, additional content is inserted into a channel having a silent period, the inserting being at a time prior to the silent period, playing of content of the channel between the inserting and the silent period being delayed.

An embodiment may comprise a user client provided to recipients of the distributed channel, the client being configured to control play of the distributed channel.

In an embodiment, the control of play comprises one member of the group consisting of: using channel content to affect further content, directing the channel to deliver internet content, directing the channel to interact with a given communication device, directing the channel to interact with a given computer, and directing the channel to interact with a navigational device.

In an embodiment, subsidiary channels are provided alongside a main channel for providing user selectable additional content.

In an embodiment, the user client is configured to control content play to pass from a main channel to a corresponding subsidiary channel and from a subsidiary channel to a corresponding main channel.

In an embodiment, the user client is configured to control content play to pass between two subsidiary channels of a shared main channel.

In an embodiment, the user client is configured to return play to a main channel at one member of the group consisting of: multiple predetermined play positions within channel content, a content play position reached when leaving the channel and a current content play position.

In an embodiment, the user client further comprises a content fast forward control and a content fast back control.

An embodiment may comprise a control to obtain content from Internet addresses, wherein a list of available internet addresses are provided by one member of the group consisting of being preloaded, being obtained from an indicated location, being provided within a link, and being obtained from a separate device.

An embodiment may comprise a control to obtain content from Internet addresses, wherein an internet address is identified following identification input from a user.

In an embodiment, internet site content is presented using predetermined presentation styles.

In an embodiment, the user client is configured to treat data being received from a smartphone as an additional channel.

In an embodiment, the content is video content and the broadcast label comprises a visual invitation.

In an embodiment, the broadcast label comprises a human inaudible sound notification.

In an embodiment, the inaudible notification is mediated to be provided conditionally to the user.

An embodiment may comprise a recording application for recording information from the environment, the environment including the content, the information identified according to predetermined criteria.

The system may be configured to play back the recorded information.

In an embodiment, the predetermined criteria define contact information, the system being configured to use the recorded information in order to make contact.

In an embodiment, the operating comprises any of:

placing a telephone call, altering a content play path to temporarily play alternative content prior to returning to the channel content, interacting with navigational information, and interacting with an external device.

An embodiment may comprise a learning module (LM) configured to track user behavior so as to be able to trigger automatic interactions on the user's behalf.

An embodiment may comprise an operational mode interface for setting an operational mode to control the automatic actions.

In an embodiment, the interactive receiver device is configured with user identification for identification of individual users, thereby to separately track behaviors of multiple users and combinations of users.

According to a second aspect of the present invention there is provided a channel distribution system comprising:

a main channel carrying content; and an interactive receiver device for receiving the content and presenting to a user, the interactive receiver device comprising an interface for allowing a user to interact with the content;

wherein the main channel further comprises a broadcast label superimposed on the content, the label inviting the user switch over to a subsidiary channel, the, the subsidiary channel being a channel dedicated to carrying content which is complementary to the main channel content.

According to a third aspect of the invention there is provided a channel distribution system comprising:

a primary content carrying channel;

a secondary content carrying channel wherein content of the secondary content carrying channel is related to content of the primary content-carrying channel; and an interactive switching interface comprising labels superimposed on the content, and an instruction for switching between the primary content carrying channel and the secondary content carrying channel based on a user response to the label.

According to a fourth aspect of the present invention there is provided a channel distribution method comprising:

providing content for broadcast in a content channel;

superimposing on the content a broadcast label, the label inviting a user to interact with the content;

providing with the label an interactive link, the interactive link comprising a digital instruction for use by an interactive receiver device, the digital instruction containing handling information for the interactive receiver device to indicate to the receiver device how to handle a user interaction coinciding with the label; and broadcasting the channel carrying content to multiple recipients.

According to a fifth aspect of the present invention there is provided an interactive receiver device for receiving an interactive broadcast content channel and presenting the channel to a user, the interactive receiver device comprising an interface for allowing a user to interact with the content, the channel comprising a broadcast label superimposed on the content, the label inviting the user to interact with the content, the label being combined with an interactive link, the interactive link comprising a digital instruction to the interactive receiver device, the digital instruction containing handling information for the interactive receiver device to indicate to the receiver device how to handle a user interaction coinciding with the label, the interactive receiver device being configured to play the broadcast label to the user and to handle the user interaction in accordance with the digital instruction.

According to a sixth aspect of the present invention there is provided a channel distributor comprising:

a distributor unit for distributing at least one channel carrying content; the channel distributor being configured to superimpose on the content prior to distribution a broadcast label, the label inviting the user to interact with the content, the label being combined with an interactive link, the interactive link comprising a digital instruction to an interactive receiver device, the digital instruction containing operating information to operate the interactive receiver device in response to a user interaction coinciding with the label, the operating being combined with continuing content play.

In an embodiment, the distributor unit is configured to distribute subsidiary channels alongside a main channel for providing user selectable additional content.

In an embodiment, the digital instruction enables the user client to control content play to pass from a main channel to a corresponding subsidiary channel and from a subsidiary channel to a corresponding main channel.

In an embodiment, the digital instruction enables the user client to control content play to pass between two subsidiary channels of a shared main channel.

In an embodiment, the user client is configured to return play to a main channel at one member of the group consisting of: multiple predetermined play positions within channel content, a content play position reached when leaving the channel and a current content play position.

In an embodiment, the set of users listening to the channel consists of a single user.

An embodiment may comprise disabling the continuing broadcast when there are no users playing the continuing broadcast.

According to a seventh aspect of the present invention there is provided a channel distribution system comprising:

a channel carrying content; and an interactive receiver device for receiving the content and presenting to a user, the interactive receiver device comprising an interface for allowing a user to interact with the content;

wherein the interactive receiver device further comprises an identification unit configured to identify the content, and provide to a user an identification of said content, the interactive receiver device further configured to provide an interactive link along with said identification, the interactive link comprising a digital instruction to the interactive receiver device, to provide additional information regarding said content upon interaction by said user.

In an embodiment, said content comprises musical content, and said identification unit is configured to identify said musical content and obtain said additional content based on said identifying.

In an embodiment, said identification system is configured to obtain a sample of said content, generate a signature from said sample, and submit said signature to a music database for comparison in order to obtain said identification.

In an embodiment, said content is associated with a provider, said identification of said content comprises identifying said provider, and said additional information is made available from said provider.

According to an eighth aspect of the present invention there is provided a channel distribution method comprising:

receiving content of a content channel and presenting to a user;

providing a first interactive interface for a user to indicate interest in specific content;

upon receipt of said indicated interest, identifying the content;

providing to said user an identification of said content;

providing a second interface, the second interface including an interactive link along with said identification, the interactive link comprising a digital instruction to provide additional information regarding said content upon interaction by said user;

upon receipt of said digital instruction, providing said additional information.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions.

Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 1 is a simplified diagram illustrating prior art systems for user interactive audio channels in one-to-one distribution;

DESCRIPTION OF SPECIFIC EMBODIMENTS OF THE INVENTION

Figure 2:
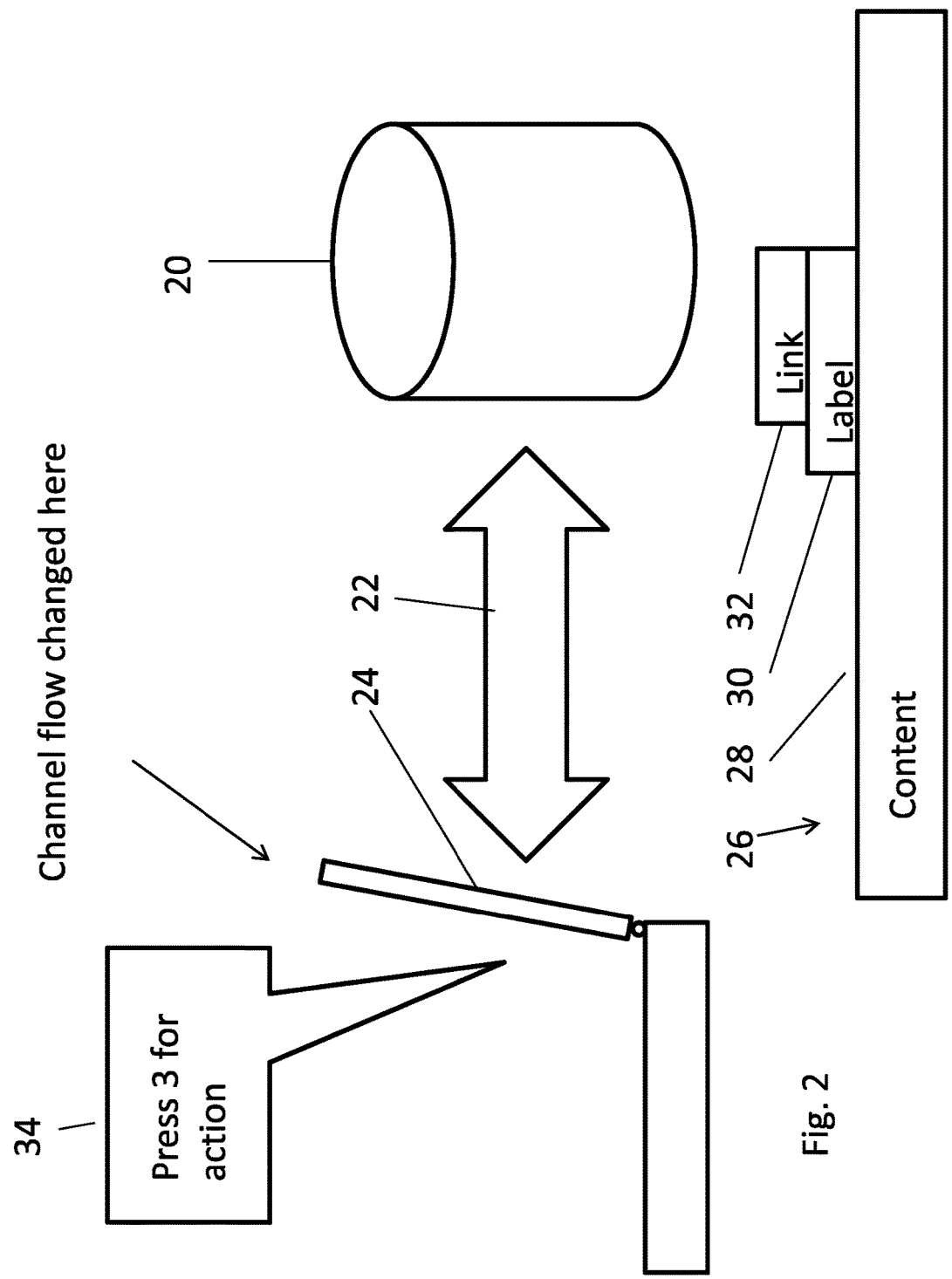
FIG. 2 is a simplified diagram showing a user interactive audio or video channel in a one-to-many or broadcast distribution according to an embodiment of the present invention.

The present invention, in some embodiments thereof, relates to interactive channels and to devices, systems and methods for providing the same.

An interactive broadcast channel may include content, and superimposed on the content, two separate items, an indicator or label that the user is aware of so he/she knows to interact, and an encoding to tell the computer what to do when the user interacts, or what to do with different interactions.

In the present embodiments, the regular radio channel may play a jingle or provide a voice message to the user providing a time window for interacting. A link is only active during the time window, in other words for a limited time after the indication. The embodiments may be viewed as providing an audio or video version of the well-known hotlink of the world-wide web. The indication may be other than the content item itself. The prior art is limited to actions that are already present on the user's computer. The present embodiments have no such limitation, since both the link and the auxiliary content are broadcast and thus completely new actions may be defined at any time prior to the broadcast.

The label is the same for all users, but links may in one embodiment be encoded so as to be activated differently at different receivers.

The channel may include predetermined content or a content sequence that is not controlled by the user except through use of the interactive links as described herein. In addition the user may have preferences that are used to assign him/her with a particular channel.

A channel player, for receiving and playing the interactive channel and allowing user interactions via an interface, can be realized physically, as a dedicated device, similar to a radio receiver found at home, or can be implemented on any existing device having suitable computing abilities, such as a car radio or a smart-phone or as software on a computer or on a television set, as discussed above.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Referring now to the drawings, FIG. 2 illustrates a first embodiment of the present invention.

A channel distribution system is here shown as a server 20 and may transmit audio or video streams as a channel. The stream is typically one-to-many in that many users share the single stream, so that all users share the same stream. This in the embodiment of FIG. 2 the transmission from the distribution stream over distribution medium 22 remains the same for all users. In one too many broadcasting the channel content is predefined, so that individual users do not have control over the content sequence.

The channel may be transmitted from the server 20 over medium 22, which may comprise the Internet, wired telephony, wireless telephony, broadcast over the air or cable including optical cable, or satellite, any other suitable medium or some combination thereof.

The channel, which is carrying content, is received at an interactive channel receiver device, 24, typically a computing device of some kind, such as a desktop computer, a laptop computer, a notebook or notepad-type device or a pod or a mobile or cordless or fixed telephony device, or a dedicated device. The device receives the content and presents the content to the user, typically by playing the content. The channel may comprise a video channel or an audio channel or both.

The interactive receiver device 24 comprising an interface for allowing a user to interact with the content.

The channel is shown schematically at 26 and includes content 28 as well as a label 30 which is broadcast with the content and superimposed on the content. The label typically is of the same media type as the content, thus audio with audio or video with video, but alternatively could be audio or subtitles superimposed on the video. The label invites the user to interact with the content in some way. The label is further combined with an interactive link 32 which comprises a digital instruction for the interactive receiver device. The digital instruction contains handling information for the interactive receiver device to indicate to the receiver device how to handle a user interaction coinciding with the label.

In use the channel is transmitted from the server over the medium 22 to the user device, where the content is played. The interactive label, superimposed on the content, is played—as indicated by speech bubble 34 for the audio case. Thus for example the user may be told to press the '3' button in order to see a particular action. The channel has provided to the user device the instruction as to what to do if the '3' button is pressed at this point, and a change is made at the user device to the content flow. The change may involve changing a play sequence, or changing a background or jumping a section, or even changing the volume or brightness or screen size.

Other possibilities for affecting the play may include using channel content to affect further content, or directing the channel to deliver internet content, or directing the channel to interact with another device such as a given telephone, or a given computer, and directing the channel to interact with a navigational device. Thus for example the channel may be an audio channel which is received on a mobile telephone and then directed to a nearby surround sound audio system.

The navigation device can provide a location which can then be used to modify play so that different regions or localities receive different play.

As will be explained below, the user response does not need to be the pressing of a particular key. Any available man-machine interface may be used, so that an audio interface may allow the user to recite the word "three" or whistle three times in order to achieve the same effect. A 3d optical interface may allow the user to show three fingers in a particular gesture in order to achieve the effect, or to nod three times.

In an embodiment, the channel may include silent periods to allow the receiving device to play additional content without having to lose content of the original channel due to time-out.

The receiving device may buffer the channel so that any extra content can be played at any time before the silent period. Then the channel is buffered until the silent period and then timing returns to normal. Buffering in this way allows a single silent period to be broadcast in the main channel and yet permit different inserts at different points on the basis of different interactions by different users.

Furthermore, since the meanings of the interactions can be superimposed on the content, the interactions can be defined for individual broadcasts, or even redefined in real time during the playing of the content.

In an embodiment, a user client, which is a software module or a hardware device or a combination thereof, is distributed to recipients of the channel. The client may be distributed either prior to or along with the content of the channel.

Figure 3:
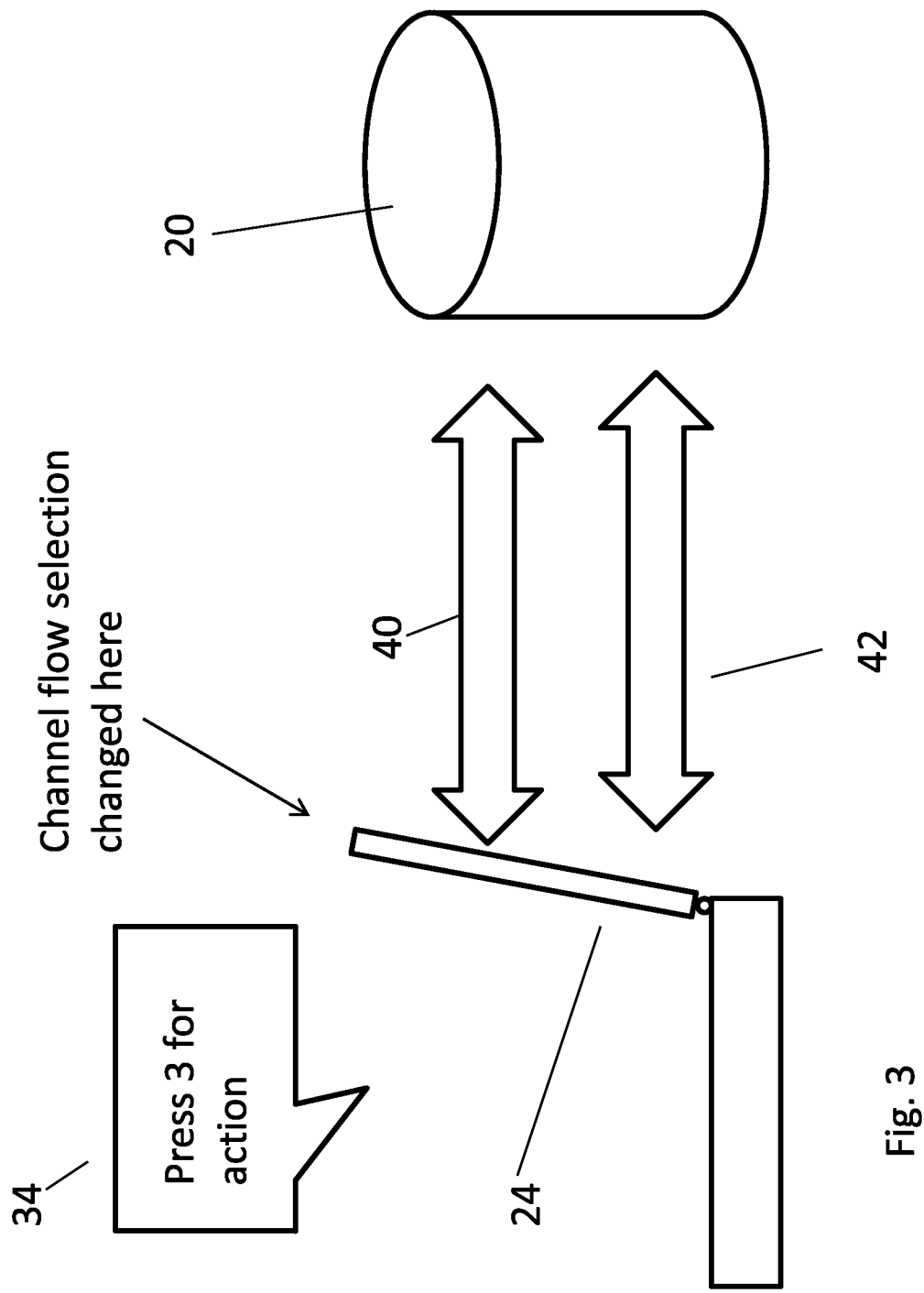
FIG. 3 is a simplified diagram showing a user interactive audio or video channel in a one-to-many or broadcast distribution according to a second embodiment of the present invention.

Referring now to FIG. 3, a similar channel distribution system is shown as that in FIG. 2 but here two channels 40 and 42 are broadcast. The remaining features in FIG. 3 are the same as in FIG. 2, are given the same reference numerals and are not described again except as necessary for an understanding of the present embodiment. One of the channels is the main channel and the second is a subsidiary channel broadcasting supporting material for the main channel. As needed there may be more than one subsidiary channel. The user interaction in fact flips the play between the main and subsidiary channel. Different users interact in different ways so that they get different combinations of the main and subsidiary channels as desired, and thus different users, interacting in different ways, may obtain different experiences from the same one-to-many broadcast. It is also possible that a few main channels together share a few auxiliary channels. This sharing may be managed by a content management system or other means such as pre-broadcast coordination or even real, or near real, time coordination.

The one or more subsidiary channels may be provided alongside the main channel for providing user selectable additional content. The user client, if provided, may control content play to pass from the main channel to a corresponding subsidiary channel, from a subsidiary channel to a corresponding main channel, and between two subsidiary channels of a shared main channel, so that considerable variation can be provided within such a one-to-many broadcast. If no user client is provided then the link 32 which is broadcast at a particular time, may contain instructions for the relevant play. Again, blank sections of the main channel can be used to ensure that users with different play paths can be returned to the main channel timing even if not all play paths are of the same length. For users with shorter interaction times, or who do not interact, patches of audio may be automatically inserted to cover the silent periods.

The user client may return play to a main channel at the current play position of the main channel. Alternatively the user may be returned to the play position that the main channel had reached when the change was made to the auxiliary channel, so as not to miss any of the play of the main channel. The latter may be achieved by buffering the main channel at the receiving device. Alternatively some intermediate location may be returned to, say if buffering capacity is exhausted. For such a case, a FIFO buffering scheme may be used.

Buffering may also be used in a different way to provide a content fast forward control and/or a content fast back control.

As mentioned, there may be provided a control to obtain content from Internet addresses. A list of available internet addresses may be preloaded. Alternatively, the addresses may be available at an indicated location, and the location may be encoded in the broadcast over the channel. As a further alternative, the locations may be obtained from a separate device. For example a channel decoder may contain information to enable the recipient to obtain particular Internet information. The channel decoder may send different users to different locations, for example depending on a level of membership or the like.

The user's interaction may be used to select between or even provide an Internet address. The content of the Internet site may be presented in different ways, which may be defined by the user client.

Figure 4:
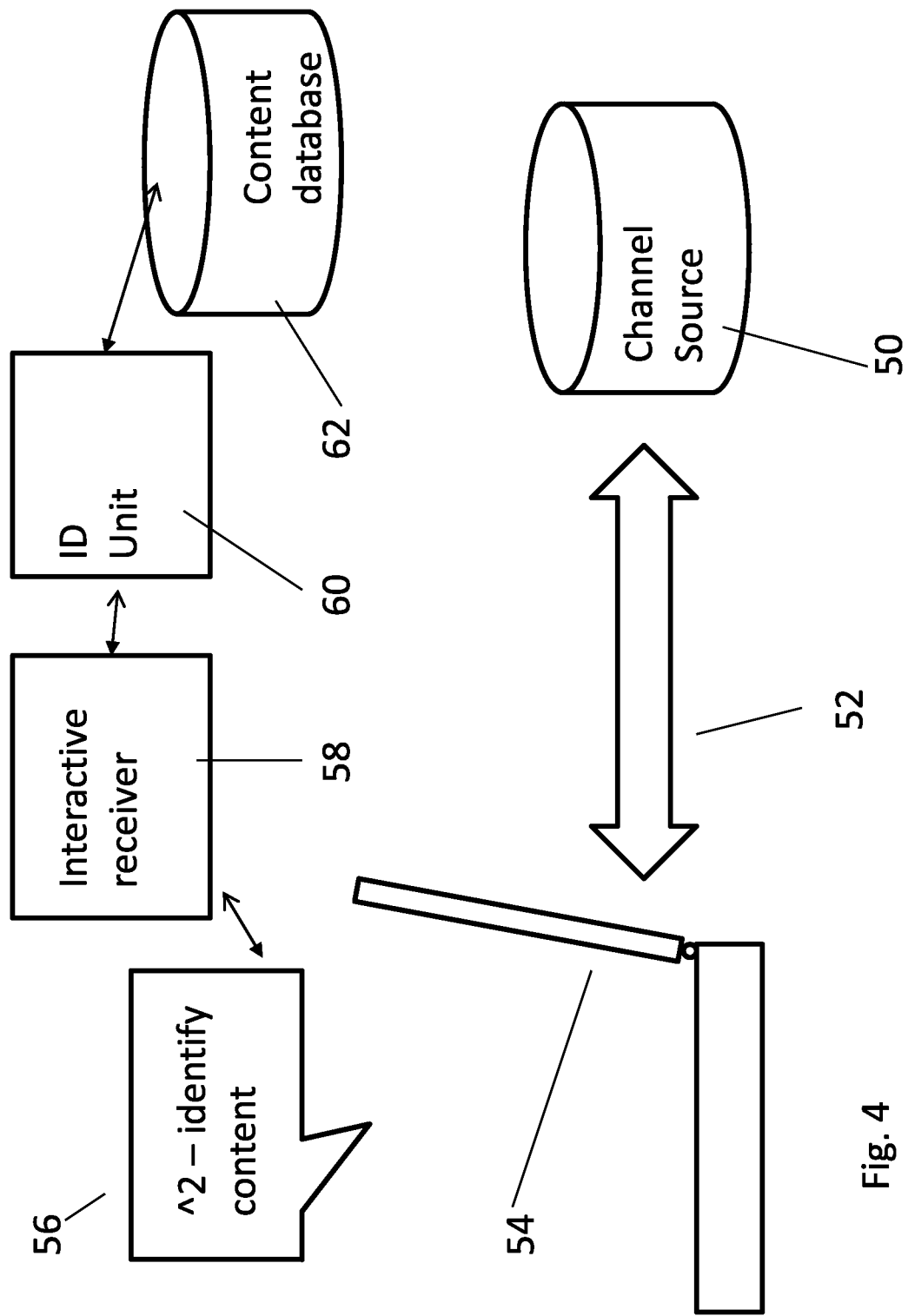
FIG. 4 is a block diagram illustrating a further embodiment of the present invention, in which an interactive interface is preset for the user.

Reference is now made to FIG. 4, which illustrates a channel distribution system according to a further embodiment of the present invention. In FIG. 4, a channel source 50 provides a channel 52 carrying content. The content is played on user terminal device 54.

In this case, the label is not continuously broadcast, but rather is initially provided, in that the user is given a code or gesture voice command or the like,—exemplary user interaction shown in bubble 56, which operates interactive receiver 58. Once set up, the command can be used at any time that the system is in operation. Interactive receiver 58 samples the content and passes the sample to identification unit 60 for identification. The identification unit returns an identification of the content to the user and provides an interface for allowing a user to interact with the identified content. The interface may comprise an interactive link provided alongside the content identification. The interactive link may include a digital instruction to the interactive receiver device, to provide additional information regarding the content upon interaction by the user. The additional information may include additional opportunities for interaction by the user.

In one example, the content is musical content, and the identification unit 60 may identify the musical content and obtain additional content based on the identification. For example the additional content may be a download file of the music or a download file of an associated music video, or the history of the musical item or criticism or appreciation of the musical item.

In an embodiment, the identification unit obtains a sample of music, generates a signature from the sample, and submits the signature to a music database, such as content database 62, for comparison with prestored signatures, in order to obtain the identification.

In another example, the content is associated with a provider, and identification of the content comprises identifying the provider. Once the content is identified, the additional information may be made available, which in such a case may be information from a provider. Such an embodiment is particularly suitable for commercial advertising. A user who is particularly interested in a product being advertised may use the gesture or code to interact and obtain further details or special offers etc. The same embodiment is particularly useful for providing educational information or a broadcaster's scheduling information.

Figure 5:
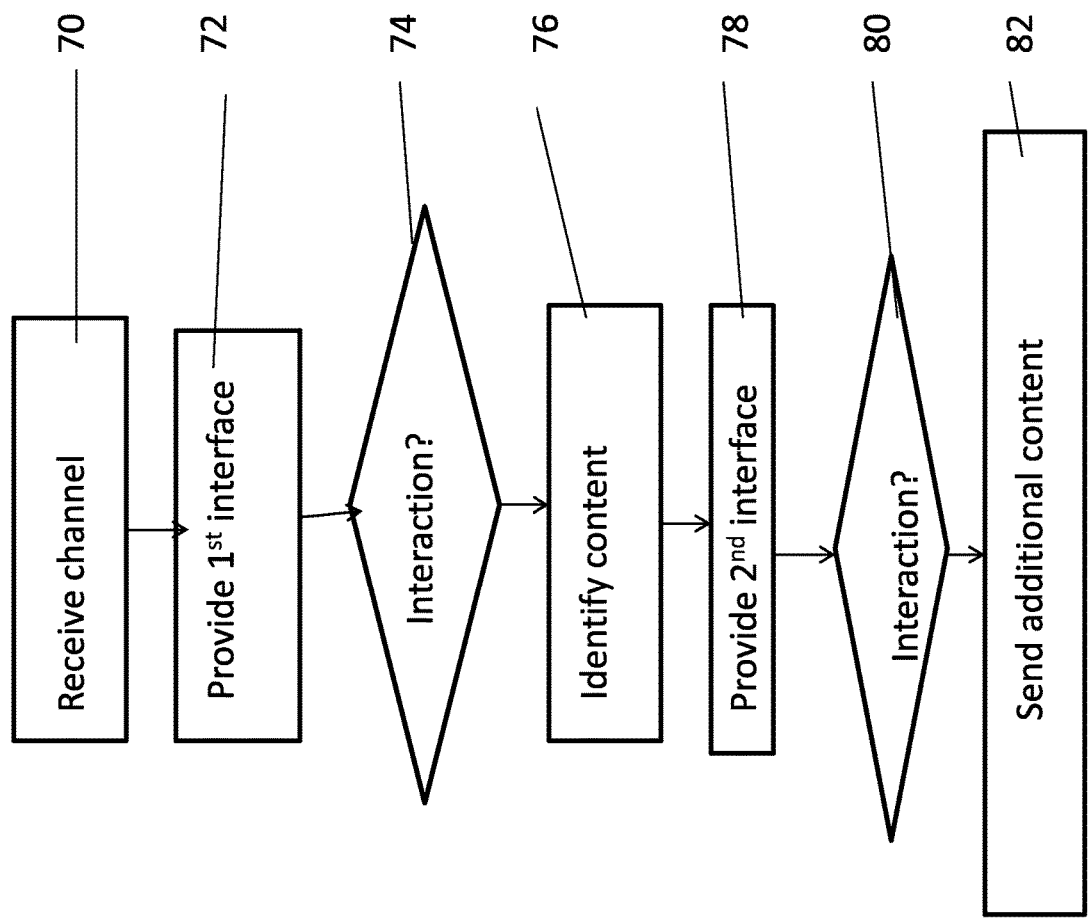
FIG. 5 is a simplified flow chart illustrating operation of the embodiment of FIG. 4.

Reference is now made to FIG. 5, which is a simplified flow diagram showing the operation of the embodiment of FIG. 4. A channel distribution method comprising receiving content of a content channel and presenting to a user as shown in box 70. A first interactive interface is provided for a user to indicate interest in specific content, for example the user may press a particular key or key combination, speak a command or make a predefined gesture-box 72. Upon receipt of the indicated interest—box 74, the system identifies the content, box 76. An indication of the content may then be provided to the user, for example the title of the song being played—box 78.

The user is then provided with a second interface, again this may be a key or key combination, a predefined gesture or a predefined sound or any other kind of person-computer interaction—box 80. The second interface may include an interactive link along with the identification, and the link may include a digital instruction to provide additional information regarding the identified content. The user then operates the interface, box 82 and the additional content is sent—box 84.

The identifying may involve obtaining a sample of the content, generating a signature from the sample, and submitting the signature to a music database for comparison in order to obtain the identification.

Alternatively, the content may be content associated with a particular content provider, so that the identifying part involves identifying the provider. The additional information is then made available from the provider, as discussed above.

Exemplary embodiments of the invention are now considered. The present embodiments may extend the functionality of channel receiving devices including radio receivers. Activation may be by any of: eye, hand, head movements or gestures, touch, whether of the screen, a touch surface or pad, a car steering wheel button or similar device, mouse, voice command, whistle, airflow, head mounted helmet or other thought capturing devices, and through very short range broadcast, including RF, infra-red or UV, or Bluetooth™ or ultrasound.

The functionality to be provided may include any combination of the following capabilities:
1. Reacting to channel content in order to affect further content.
2. Affecting channel operation such as on/off, channel, volume, quality, and delivery mode.
3. Directing the channel to deliver Internet content such as headlines, articles and the like.
4. Directing the channel to deliver educational material, such as MOOCS content.
5. Directing the channel to deliver content to/from a smart phone located nearby or remotely.
6. Directing the channel to deliver content to/from a personal computer located nearby or remotely.
7. Directing the channel to deliver content to/from a navigational device.

The broadcast may contain identified segments that are holes or blank or silent sections in the broadcast. A hole can be filled with local information such as feed from social networks, email or the web.

Such a hole may simply appear as a silent interlude if there is no content and the hole is reached or some default material may be provided to play during the interlude.

A hole can be placed at the end of a broadcast segment. Thus, if an interrupting update arrives at a time prior to appearance of the hole, then the update can be voiced while the actual broadcast is recorded and transmitted, the chunks being played after a suitable delay at those players who chose to hear the update. Thus the users hearing the update use the time of the hole at the end of the segment in the middle of the broadcasted segment. Alternatively, the hole can be used for a one-to many update played with the broadcast by adding the update at the sending end.

A listening component in a cellphone or similar device can be used to record other interesting environmental sound snippets based on a list of keywords. The recorded snippets would usually contain entity descriptions and access details such as phone numbers, web addresses, social networks access details and the like. An application on the device may be used either immediately (if so indicated via user preferences or key words related preferences) or later on to present the items and their contact details and enable the user to contact a desired entity, for example via a phone call, an email message, a text message or other means. Thus the user may be given a web or email address during a telephone conversation and the component may identify and record the address as a snippet, so that the user can replay the snippet later and contact the address, or write down the details when eventually finding a pen and paper.

Capabilities

The following is a non-exhaustive list of capabilities enabled by making the channel content navigational.

Reacting to Channel Content in Order to Affect Further Radio Content

Certain portions of the broadcast may be marked for navigation as discussed above. The channel identity that is provided by such portions may be referred to as a broadcast link (BL). For example, certain background music may indicate such a portion. So, for example, the announcer may say "for more details click now" with the background music indicator. If the user reacts now (e.g., by touching the device surface, or button, or by outputting a short whistle or any of the other ways mentioned above), the channel may switch to a different channel, as per the embodiment of FIG. 3, in which further details are provided. The BL may be encoded in a music portion, may be explicitly provided via tones, such as telephone dial tones, or may be provided verbally—and decoded by speech decoding software. The link may have a label part as above, which is sensed during play and a digital part which tells the software what to do. The digital part may be superimposed at a different frequency on the current broadcast or may be on the other channel referred to above. Alternatively a separate digital channel may be provided for link information which is separate from main and auxiliary content channels.

Physically, switching may be achieved in a variety of ways. If the channel is broadcast based, the play device may switch to a different frequency. A satellite device will switch to a different channel. An Internet device may obtain content from a different http source, and so on.

Once switching is executed, there may be further switching actions as further labels may be placed in the switched-to content. At some point there may be a return to the previous channel, which may be indicated either in response to an available action or without a label but using one of the signalling methods referred to above to indicate a return to the previous content, for example a double whistle or a short tap on the surface, or a button push. Resumption to a previous channel may be carried out in two basic modes and variations in between, as explained above. One basic mode is to rejoin the channel at its current state of progress. Thus, the main channel continues broadcasting and the resumption is at the point the channel has now reached. A second basic mode is to join the channel at the point it was left. This may be achieved by buffering and/or by taking advantage of silent periods in the broadcast. In cases where the second mode is not feasible, perhaps due to unavailability of past content or because limits of buffer storage of such content are exceeded, there may be a best-effort mode.

There may also be fast-forward and fast-backwards modes that can be associated with any channel at any time, and again, such modes may be operated using defined signals including any of the kinds mentioned above.

Affecting Channel Operation Such as On/Off, Change-Channel, Volume, Quality, and Delivery Mode All standard controls such as on/off, change-channel, volume control, image quality control, and delivery mode control, are provided in standard form as well as by the other interaction methods indicated, including sound, word command, touch, gesture, thought (e.g., as detected via EEG or fMRI) etc.

Directing the Player Device to Deliver Internet Content Such as Headlines, Articles and the Like Delivery of Internet content may be achieved in a variety of ways:
1. Pre-defining Internet sites from which content may be presented. The pre-definition may be (a) pre-supplied and/or (b) loaded from a smart-phone, a portable computer, a disk-on-key device, for example as a look up table or a look up file. The particular site for switching at any given interactive control may be indicated in a variety of ways. Thus a list of sites or their nicknames may be read by the device, and, in response, a word command may be given by the user, or the user may click or otherwise indicate a number on a screen or a keypad or by gesture or audibly.
2. The user may signal a wish to switch to a site, and may then utter a word indicating the site or may react to a list of possibilities that the player provides.

Once switched, the content may be presented in a best-effort fashion. For example, a sound track is simply played (e.g., .wav files). Text is converted to speech and spoken. The particular way in which a utilized page is to be presented may be called a style. The user can use a default style, select a preferred style and also switch between styles. An example for a style for a news site may be to provide story headlines first, and then provide one story at a time. One can navigate further based on links available on the page. Here too, the way in which further links are presented may be style dependent.

One may go back to previous channels and/or pages as in the first item on switching to and returning from channels.

Directing the Channel Player to Deliver Educational Material, Such as MOOCS Content A special case is that of switching to educational material, such as an online academic course. Each major provider (e.g., Coursera, Edx) has its own common navigation possibilities. The available navigation may be coupled to signals that enable the channel user to navigate the material in accordance with the present embodiments. It is noted that an educational channel is simply another channel and the rules governing switching to and returning from channels apply to educational channels as well.

Directing the Channel Player to Deliver Content to and/or from a Smart-Phone Located Nearby or Remotely The case of a nearby phone presents the possibility of introducing the two devices, channel player and smart-phone, and having them communicate, for example via Bluetooth. The coupling mode may be predefined with a default mode in case no special mode is defined explicitly. The channel player may look at the smart-phone as a channel, and may switch to the smart phone and be able to provide content such as mail messages, voice messages, instant messages, say from Viber, Skype, What's Up, and SMS, social updates from networks such as Facebook and Twitter, and/or also provide the content of a phone call or messenger call in loudspeaker mode.

The smart-phone may also be operated from the channel player. For example, commercial content may include a phone number with a background mode indicating possible switching. By signalling the activation, the switching takes place, the smart-phone calls the number and the conversation can be managed from the smart-phone or the channel player. The actual mechanism may involve dial tones that the channel player produces and the smart-phone application hears and converts to a dialing action. Another possibility is the number is pronounced and voice understanding software provides the number so as to allow the phone to dial accordingly.

If the smart-phone is remotely located, the channel player may have means for creating contact with the smart-phone. This can be done in agreed-upon web sites on which the phone deposits/reads contents. Additionally or alternatively, contact can be provided by contacting the smart-phone directly; in this case the channel player can do it through the Internet or through a cellular network, in which case the channel player is a cellular network client. Additionally or alternatively contact can be made via cable if the channel player has cable access.

Directing the Channel Player to Deliver Content to and/or from a Personal Computer Located Nearby or Remotely Directing content to or from a personal computer, laptop, notepad, palm top, pod or like computing device, is similar to delivering content to or from a smart-phone, except that dialing is not an issue.

Directing the Channel Player to Deliver Content to/from a Navigational Device As with the interface to a smart-phone, in this case a navigational device, such as a GPS device with a navigation program, can be another channel. The functionality may be in both directions. The navigational device may provide content to be presented via the channel player, e.g. details of nearby restaurants. The channel player may feed data such as physical addresses, say the location of a pizza store, to the navigational device, and can then play navigation directions from the navigation device directly or via a sound channel.

The navigational device may be a separate device or may be incorporated into the channel player.

Using Current Devices

The present embodiments may be implemented on existing devices by adding application programs to smart-phones and/or computers that decode sound (dial tones, verbal utterings etc). The scheme may also utilize intelligent agents (e.g., Apple's Siri) on smart-phones and/or computers. For example, a special app on a smart-phone can be programmed to trigger on a special sequence of tones and then perform a telephone call to the number indicated using a subsequent series of digit tones. In this case, no new hardware is needed to realize a basic operational functionality.

Ordinary Car Radio

Two car radio buttons, 1 and 2, are pre-set to two FM stations (channels), say 107.5 (button 1) and 110.5 (button 2). 107.5 is the primary channel and 110.5 is the auxiliary channel. The driver listens to a commercial that is broadcast on 107.5. A chime sound indicates that further details are provided on 110.5. By simply pressing button 2, the driver can listen to the extended offer description on 110.5.

A Cell Phone Application

A cell phone application records sounds from the environment. It keeps those that are detected to have access details. A simple example is a radio announcement "you can buy a 2013 Buick with 20%, call 9145555050 for details". The application may retain the entry composed of: text (speech to text translation), the original audio, and the phone number in textual form (again using speech to text translation). The user can later on review the entries and decide whom to contact. Contacting may then be achieved by, for example, double clicking on the phone number. Recording may also be carried out in public areas, e.g. a shopping center. Recording may also be carried out at frequencies not audible to humans, so that certain messages do not pollute the environment. The user can control what is being recorded by providing keywords whose appearance triggers storage and/or presentation. Some keywords may be associated with immediate action. Thus for example, a non-audible-frequency message may indicate an immediate sale on a particular brand of soap at aisle 4. If, for that user, a soap & sale combination triggers an immediate action, the user is now notified, say with a special sound or device vibration.

Human Channels

A channel may be an actual human conversing. The human may be reached via the cellular network, cable, through a smart-phone, or a computer.

Functionality Built into a Television Set

All of the above functionality may be applied to a smart television set. In particular a visual screen can present visual channel switching possibilities. Switching can be activated as in the case of the dedicated channel players referred to above. Visual channel switching can be activated by gesturing, focusing eyes on, direct touch or pointing through a remote control device. A television set may be cable based, Internet based or based on other forms of communications such as 3G.

Device with a Learning Component

The device described thus far may be equipped with a Learning Module (LM). The LM can record, study and learn from user behaviour. For example, if commercials dealing with concert offerings usually result in channel switching for the user, such switching may be done automatically without user directive. Such automatic activity may be controlled by setting different modes of operation to enabled, disabled or partially enabled states. The LM may also track the behaviour of multiple distinct users, say using log-in type identification or using voice or fingerswipes or image based identification. The LM can also deduce user interest or lack thereof from negative behaviour, namely, switching for a very brief time period and returning during manual operation but also during automatic operation. The LM may thus keep track of other user related operations and present options that are likely to be interesting to the user. Further, the LM may connect, via a SIM card, a nearby cell phone or other means, to a centralized facility for tracking and evaluating users' behaviours, individually and as a group. Such a facility may interact with a Content management System such as that described hereinbelow.

Affecting Personalized Radio or TV

It is possible that the channel on which the user listens is uniquely produced for her. Nevertheless, the interaction capabilities may still allow switching to alternative content. The alternative content may simply replace what was supposed to be on the channel had no interaction took place. Alternatively, the original channel may continue playing or remain idle while the user is switched to a different channel for the alternative content.

Some Technical Aspects

One aspect of the presently described technology involves indicating the possible switching. There are a number of ways in which such indications may be provided:
1. In broadcasting (e.g., SW, MW, LW, FM, AM):
a. Prior to, or directly after, a background music indication or announcement or like indication, the system may broadcast encoded numbers indicating the channel type and its characteristics.
b. Prior to or in parallel with the announcement etc, the system may broadcast the numbers indicating the channel type and its characteristics on a different agreed-upon twin channel. As discussed above, the twin channel may be the same as a channel carrying auxiliary content, or may be a dedicated digital channel.
c. The system may have some of the indication itself encode the switching numbers, for example tones as in tone dialing may be audibly encoded.
d. The system may use ordinary speech, which necessitates speech understanding software on connected devices and/or the channel player itself.
2. In Satellite and Cable Channels, solutions may be used which are similar to those of broadcasting channels.
3. Internet Channels. To access Internet Channels the channel player needs an Internet connection. The may be provided via wi-fi, cable, 3G service (sim), and hotspot. Once provided, the channel to switch to can easily be indicated numerically or alphanumerically.

A Content Management System (CMS)

A content management system (CMS) may manage the broadcast over a number of channels and enable switching among them in order to provide links for alternative content. In an embodiment, the alternative content is provided in real time or near real time, meaning that the alternative content can be selected or changed shortly before or even during the broadcast.

The CMS may, in one embodiment, manage a sales force to handle the generated customer traffic. Thus, it may dynamically change the provided BLs.

The CMS can also allocate different BLs to different channel players based on an internally recorded identifier of the particular channel player, or on the profile of a logged in or otherwise identified user. The channel player may additionally or alternatively add its own identity to the BL, prior to presenting to the user, so as to create a seemingly random or personalized new channel assignment. Randomization can provide for load balancing, for example on the human channels referred to above, that may be provided using a BL which is a phone number.

Scenarios

The following is a non-exhaustive list of usage scenarios. Other scenarios will become apparent to those versed in the art.

Scenario 1: Details About a Commercial Offering

An announcer in a commercial over AM radio says " . . . for further details on this great car offer click now". At this point there is a short music section followed by a sequence of tones encoding a different frequency. The user taps the radio surface or an unused radio button, for example the CD fast forward button). Channel switching takes place, and details concerning the car offer are announced as an alternative play of the channel. At the end of the portion, the user may be provided options. For example, one of the options may be "double tap to return". Assuming the device is set to a mode for rejoining the main channel in real time, upon a double tap the original channel broadcast resumes. Interrupting options may also be available throughout the broadcast of the alternative material. Thus assuming a default in which a double tap brings back the previous play, the user can escape back and join the original channel by performing a double tap.

Scenario 2: Further Navigation

Continuing scenario 1, the new content may include the possibility of further navigation. For example, financing the apartment purchase may depend on the user's bank. The announcer may present possibilities to move to bank A (single tap) or bank B (double tap). The announcer may also present a list of banks with the opportunity for a single tap after the right name is announced.

Scenario 3: Actually Contacting a Salesperson by Feeding a Number to Call

The announcer in a commercial over AM radio says " . . . for further details on this great car offer contact a salesperson now". At this point there is a short music section followed by a sequence of tones encoding a phone number. The user's smart-phone is provided the number via Bluetooth or some other connection mode or via a listening microphone. Should the user indicate interest (a tap say), the number may be dialed and the user may consequently connect to the salesperson via the smart-phone. Such a connection may also be made directly to the dialer of an

Scenario 4: Viewing More Details on a Web Site

The announcer in a commercial over AM radio says " . . . for further details on this great car offer view details now". At this point there is a short music section followed by a sequence of tones encoding a phone number or an actual verbal expression of the web site. Should the user indicate switching to the web site, there are various possibilities. One is to decipher the web address and feed it to a connected computer or smart-phone, where the content may be viewed. Another is to have the channel player approach the web site and display the approached web site in a predetermined mode or a dynamically determined mode or style. The style may also be provided by the web site itself.

Choosing between the alternatives may involve using a pre-set or default mode of operation, or soliciting user's instructions.

Scenario 5: Interfacing to a Navigational Device

The announcer introduces " . . . this great Pizza place on Elminda, to which you can navigate by clicking", then music. Upon tapping (or whistling, or some other agreed upon indication), the address is fed into the navigational device that starts a navigation session to the desired address.

Scenario 6: Switching to a Human Channel

Switching to a human channel is similar to scenario 1 above. Here the channel that is switched to is an actual human being in real-time, say a reporter. The human being may provide real-time first-hand information, say about the number of people in line at a particular location. The reporter may receive actual directions from the user if the channel is a bi-directional communication. Bi-directional channels may be implemented using a SIM card installed in the channel player, or alternatively may be set up over an Internet link.

Scenario 7: Cell-Phone/Computer Collecting BLs for Future Use

An application on a cell-phone or computer that is positioned next to the channel player or television set appliance, or perhaps directly, or via Bluetooth, connected to the appliance, or may even be included in an application running on the channel player. During broadcast, the application listens and collects BLs. If the user is interested in an item that was broadcast, the user can at any time leaf through the collected BLs and direct the cell-phone to the channel, or feed back the chosen BL to the channel player and let the channel player switch to the chosen channel.

In this way a smart phone may listen to a broadcast and be ready with contact numbers when needed.

Scenario 8: Cell-Phone/Computer Using BLs

Continuing scenario 7, the listening cell-phone or computer has an identifier, that identifier may be mentioned in a BL. This mechanism may be used in game shows, raffles and other events where a listening user wins a prize for being a listener. This may be used to increase audience size. Upon winning a switch to a channel declaring the prize may be performed.

List of Specific Features and Implementations

The following is a summary of different features and implementations of an interactive channel broadcast system and a channel player according to the present embodiments.

1. A voice-channel-based device or system for data exploration and integration providing the capability of switching among broadcast channels based on broadcast links (BLs).
2. Switching may be effected via voice, touch, tap, thought, air flow, gesture, or eye movement. The tap may involve a currently unused interface button or a button specifically provided for the purpose.
3. During a broadcast, the BLs may point to a new channel, may be indicated by special music, special tones, a music encoding of the new channel, dial tone encoding, verbal expression of a new channel identity, or a short range broadcast.
4. Upon switching to a new channel based on the BL, the user may be provided with the ability to switch back to the original channel, either at any time or at specific times.
5. Upon switching to a new channel based on the BL, the user may be provided with further options of navigating to new channels.
6. A new channel feed may be provided, say by a still camera or a video camera.
7. A possible voice-channel source is radio transmission.
8. A possible voice or video channel is an Internet site.
9. A possible voice or video channel may involve a smart-phone.
10. A possible voice or video channel may involve a computer.
11. A disk-on-key or other storage device may provide a voice or video channel.
12. A possible voice-channel is a music-storing device.
13. The channel player may exchange data with a navigational device for performing navigation and providing local information.
14. The device can be a dedicated device or alternatively may be implemented in software on a computer or smart-phone.
15. The device may receive input and\or output via very short range broadcast.
16. The very short range broadcast may be Bluetooth, or may use infra-red, or RF microwave or UV, or ultrasound as transmission media.
17. The device may receive input via a disk-on-key or optical disk or over the Internet or from a preparatory broadcast. Such input may be used to set an operating mode or download a user client.
18. The device may have a number of modes of operation.
19. The user may retain a default mode or select a preferred mode of operation.
20. The device may generate a phone call via a smart-phone and the cellular network, via a SIM card, or via a land-line phone or via the internet.
21. The device may set up a bidirectional link.
22. The broadcast system may manage a broadcast on a number of channels and enable switching between the channels to provide the interactive content.
23. The system may manage a sales force to handle generated customer traffic.
24. The device may have a hands-free mode.
25. A human may provide the content of a channel in real-time, say as a way of providing up to date reports.
26. The device may be a dedicated channel player.

27. The device may be a television set with suitable added capabilities.
28. The device may be a computer with a suitable user client.
29. The device may use visual links and touching or pointing, or a remote control device may be used to switch channels.
30. Pon switching, resumption of the original channel is available.
31. The resumption may be to the current time content.
32. The resumption may be back to the content being played at the original switching time so that none of the main channel is missed.
33. The resumption may be to an intermediate time between the switching point and the current time, for example when more content would need to be buffered than there is capacity.
34. The channel may comprise fast forward and/or backwards capabilities.
35. The channel switching may be realized on existing devices, say by adding application programs to smart-phones and/or computers and/or television devices that have the necessary computing abilities. The devices may be required to decode sound (dial tones, verbal utterings) although this is not essential.
36. The channel player may utilize intelligent agents (e.g., Apple's Siri) on smart-phones and/or computers.
37. The system may assign the BLs depending on the identity of the player or the logged in user. Such assignment can be used to separate user populations into sub-populations of 1 or more.
38. A cell-phone or computer may collect broadcast BLs from on-going broadcasts, for subsequent consideration. Thus a user may watch or listen to a channel and then obtain a list of links or phone numbers for further investigation. This also applies to collecting messages in public places such as halls, cinemas, schools, airports, hospitals, train or bus stations, etc.
39. The system may use a collected BL directly to switch to a channel, for example to provide a magazine type program providing different users with respective local information.
40. The system may provide players or cell-phones or computers with an identifier which may match a BL.
41. The system, may use an identifier to identify winners in interactive game shows or competitions or raffles or promotional campaigns or the like where users may participate from home.
42. The user may pre-set the device so that switching to a different channel occurs automatically upon BL detection.
43. The user may pre-set the device so that returning to the original channel occurs automatically following the end of a given portion on the secondary channel.
44. The user may pre-set the device so that a user indication may override automatic switching.
45. The device may be connected to a vehicle radar or any other kind of proximity alerting system. Then, switching to system accident alerts may take place as a secondary channel switch.
46. The device may be programmed so that when switching occurs, the content played on the original channel is such that the user is ready to miss.
47. The programming on the primary channel may take into account a possible switch and arrange for content, during the time switched, such that the user is likely not to care about missing it. For example, a commercial for assisted living may be followed with a piece on college education so that when the user switches to hear more about assisted living it is likely that what he misses is not relevant for him.
48. The system may switch winners to a channel carrying specific winners content while other users are switched to other content.

It is expected that during the life of a patent maturing from this application many relevant user interfaces and broadcasting methods and systems will be developed and the scopes of the corresponding terms are intended to include all such new technologies a priori.

The terms "comprises", "comprising", "includes", "including", "having" and their conjugates mean "including but not limited to".

The term "consisting of", means "including and limited to".

As used herein, the singular form "a", "an" and "the" include plural references unless the context clearly dictates otherwise.

It is appreciated that certain features of the invention, which are, for clarity, described in the context of separate embodiments, may also be provided in combination in a single embodiment, and the above description is to be construed as if this combination were explicitly written. Conversely, various features of the invention, which are, for brevity, described in the context of a single embodiment, may also be provided separately or in any suitable subcombination or as suitable in any other described embodiment of the invention, and the above description is to be construed as if these separate embodiments were explicitly written. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A broadcast channel distribution system comprising:
   a broadcast channel carrying channel content; and
   an interactive receiver device configured for receiving the content and playing the content sequentially to a user, the interactive receiver device comprising an interface for allowing a user to interact with the content during said playing;
   wherein the broadcast channel further comprises a label, the label being a playable indicator broadcast along with the content and superimposed on said sequential play of said content to be played along with said content for a limited time to said user, said user being a consumer of the content, the label as played comprising an invitation sensible to the user to interact with the content in a predetermined manner, the label further being combined with an interactive link, the interactive link comprising a digital instruction to the interactive receiver device, the digital instruction containing operating information to operate the interactive receiver device in response to said user interacting in response to said invitation, said operating corresponding to said predetermined manner and at least coinciding timewise with said playing of the label, the operating being combined with continuing content play of said content being broadcast, wherein said broadcast channel comprises a plurality of silent periods, each said silent period being a respective break in said broadcast content, said silent periods being respectively added to said broadcast channel, said silent periods providing an interval for subsequent playing of additional content in addition to play of the broadcast channel, said digital instruction defining insertion of said additional content into said silent period, the inserting of said additional content being at a time prior to a respective one of said silent periods and being carried out in response to a respective user carrying out said interaction in said predetermined manner and coinciding with a respective label, playing of said channel content being delayed to allow playing of said respectively inserted additional content, said respective silent period providing additional time to allow said channel content to be played after said insertion of said additional content.

2. The system of claim 1, further comprising a user client provided to recipients of the broadcast channel, the client being configured to control play of the distributed channel.

3. The system of claim 2, wherein the control of play comprises one member of the group consisting of: using channel content to affect further content, directing the channel to deliver internet content, directing the channel to interact with a given communication device, directing the channel to interact with a given computer, and directing the channel to interact with a navigational device.

4. The system of claim 2, comprising a plurality of main channels, each main channel associated with a plurality of corresponding subsidiary channels, the main channels being selectable by tuning and the subsidiary channels being selectable from the main channel by user interaction.

5. The system of claim 4, wherein the user client is configured to control content play to turn from a main channel to a corresponding subsidiary channel said controlling comprising using a respective interactive link, said user client further configured to return from a subsidiary channel to a respective main channel.

6. The system of claim 4, wherein the user client is configured to control content play to pass between two respectively corresponding subsidiary channels of a given main channel.

7. The system of claim 4, wherein the user client further comprises a content fast forward control and a content fast back control.

8. The system of claim 4, further comprising a control to obtain content from Internet addresses, wherein a list of available internet addresses are provided by one member of the group consisting of being preloaded, being obtained from an indicated location, being provided within a link, and being obtained from a separate device.

9. The system of claim 8, wherein internet site content is presented using predetermined presentation styles.

10. The system of claim 4, further comprising a control to obtain content from Internet addresses, wherein an internet address is identified following identification input from a user.

11. The system of claim 4, wherein the user client is configured to treat data being received from a smartphone as an additional channel.

12. The system of claim 1, wherein the content is video content and the broadcast label comprises a visual invitation.

13. The system of claim 1, further comprising a recording application separately supplied to said user, said recording application being for recording information from an environment, the recording application being configured to recognize said label when recording said channel content.

14. The system of claim 13, configured to play back the recorded information.

15. The system of claim 13, wherein the channel content comprises contact information, the system being configured to make use of said contact information.

16. The system of claim 1, wherein the operating comprises one member of the group consisting of:
placing a telephone call, altering a content play path to temporarily play alternative content prior to returning to the channel content, interacting with navigational information, interacting with a website, and interacting with an external device.

17. A broadcast channel distribution system comprising:
a broadcast channel carrying channel content; and
an interactive receiver device configured for receiving the content and playing the content sequentially to a user, the interactive receiver device comprising an interface for allowing a user to interact with the content during said playing;
wherein the broadcast channel further comprises a label, the label being a playable indicator broadcast along with the content and superimposed on said sequential play of said content to be played along with said content for a limited time to said user, said user being a consumer of the content, the label as played comprising an invitation sensible to the user to interact with the content in a predetermined manner, the label further being combined with an interactive link, the interactive link comprising a digital instruction to the interactive receiver device, the digital instruction containing operating information to operate the interactive receiver device in response to said user interacting in response to said invitation, said operating corresponding to said predetermined manner and at least coinciding timewise with said playing of the label, the operating being combined with continuing content play of said content being broadcast, and comprising play of additional content, and further comprising a user client provided to recipients of the broadcast channel, the client being configured to control play of the broadcast channel, wherein the interactive receiver device is configured to return play from said additional content to said broadcast channel at one member of the group consisting of: multiple predetermined play positions within channel content, a content play position reached when leaving the channel and a current content play position, wherein said broadcast channel comprises a plurality of silent periods, each said silent period being a respective break in said broadcast channel, said silent periods being respectively added to said broadcast channel content, said silent periods providing an interval for subsequent playing of said additional content in addition to play of the broadcast channel content, said digital instruction defining insertion of said additional content into said silent period, the inserting of said additional content being at a time prior to a respective one of said silent periods and being carried out in response to a respective user carrying out said interaction and coinciding with a respective label, playing of said channel content being delayed to allow playing of said respectively inserted additional content, said respective silent period providing additional time to allow said broadcast channel content to be played after said insertion of said additional content.

18. A broadcast channel distribution system comprising:
a main channel carrying broadcast content; and
an interactive receiver device for receiving the broadcast content and presenting to a user, the interactive receiver device comprising an interface for allowing a user to interact with the content;
wherein the main channel further comprises a label, the label being an indicator broadcast along with the content for a predetermined amount of time and superimposed on the content in a way that is apparent to said user for said predetermined amount of time, said user being a consumer of the content, the label comprising an operable link and an invitation to the user to switch over to a subsidiary channel using said operable link, the subsidiary channel being a channel dedicated to carrying content which is complementary to the main channel content, and wherein the interactive receiver device enables content play to pass from the main channel to the corresponding subsidiary channel and from the subsidiary channel back to the corresponding main channel, and wherein the user client is configured to return play to said main channel at a play location, said play location being one member of the group consisting of: multiple predetermined play positions within channel content, a content play position reached when leaving the channel and a current content play position, wherein said main channel comprises a plurality of silent periods, each said silent period being a respective break in said broadcast content, said silent periods being respectively added to said broadcast content, said silent periods providing an interval for subsequent playing of additional content in addition to play of the broadcast content, said digital instruction defining insertion of said additional content into said silent period, the inserting of said additional content being at a time prior to a respective one of said silent periods and being carried out in response to a respective user carrying out said interaction in said predetermined manner and coinciding with a respective label, playing of said broadcast content being delayed to allow playing of said respectively inserted additional content, said respective silent period providing additional time to allow said broadcast content to be played after said insertion of said additional content.

19. A channel distribution system comprising:
a broadcast primary content carrying channel;
a secondary content carrying channel wherein content of the secondary content carrying channel is related to current content of the broadcast primary content-carrying channel; and
an interactive switching interface configured to superimpose labels on the content of the primary channel to be sensible to a user for predetermined amounts of time respectively, the labels carrying respective operable links and respective instructions for switching between the broadcast primary content carrying channel and the secondary content carrying channel based on a user response to the label, the links being operable for said switching during broadcasting of said respective labels, and wherein the interactive switching interface enables content play to pass from the main channel to the secondary channel and from the secondary channel back to the main channel, and wherein the user client is configured to return play to said main channel at a play location, said play location being one member of the group consisting of: multiple predetermined play positions within channel content, a content play position reached when leaving the channel and a current content play position, wherein said broadcast primary content-carrying channel comprises a plurality of silent periods, each said silent period being a respective break in said broadcast primary content-carrying channel, said silent periods being respectively added to said broadcast primary content-carrying channel, said silent periods providing an interval for subsequent playing of content of said secondary channel in addition to play of the broadcast primary content-carrying channel, said digital instruction defining insertion of said secondary channel content into said silent period, the inserting of said secondary channel content being at a time prior to a respective one of said silent periods and being carried out in response to said user response and coinciding with a respective label, playing of said broadcast primary content-carrying channel being delayed to allow playing of said respectively inserted secondary channel content, said respective silent period providing additional time to allow said broadcast primary content-carrying channel content to be played after said insertion of said secondary channel content.

20. An interactive receiver device for receiving an interactive broadcast content channel and presenting the broadcast channel to a user, the interactive receiver device comprising an interface for allowing a user to interact with the content, the channel comprising a broadcast label superimposed on the content to play for a predetermined amount of time, the label comprising an invitation inviting the user to interact with the content, the label being combined with an interactive link, the interactive link comprising a digital instruction to the interactive receiver device, the digital instruction containing handling information for the interactive receiver device to indicate to the receiver device how to handle a user interaction coinciding timewise with playing of the label, the interactive receiver device being configured to play the broadcast label to the user alongside said broadcast content and to handle the user interaction in accordance with the digital instruction, said handling comprising playing additional content, said handling comprising returning play from said additional content to said broadcast channel at one member of the group consisting of: multiple predetermined play positions within the content, a content play position reached when leaving the channel and a current content play position wherein said broadcast channel comprises a plurality of silent periods, each said silent period being a respective break in said broadcast content, said silent periods being respectively added to said broadcast channel, said silent periods providing an interval for subsequent playing of said additional content in addition to play of the broadcast channel, said digital instruction defining insertion of said additional content into said silent period, the inserting of said additional content being at a time prior to a respective one of said silent periods and being carried out in response to a respective user carrying out said interaction in said predetermined manner and coinciding with a respective label, playing of said channel content being delayed to allow playing of said respectively inserted additional content, said respective silent period providing additional time to allow said channel content to be played after said insertion of said additional content.

21. A broadcast channel distributor implemented on an electronic processor, the broadcast channel distributor comprising:
a distributor unit for distributing at least one broadcast channel carrying content; the channel distributor being configured to superimpose on the content prior to distribution a label, the label being an indicator broadcast along with the content and superimposed on the content for playing with said content, said user being a consumer of said content, the label comprising an invitation to the user to interact with the content in a predetermined manner, the label being combined with an interactive link, the interactive link comprising a digital instruction to an interactive receiver device, the digital instruction containing operating information to operate the interactive receiver device in response to said user interaction when said user interaction coincides timewise with said playing of the label, the response to said user interaction being combined with continuing content play, the distributor further comprising a user client, wherein the digital instruction enables the interactive receiver device to control content play to pass from the broadcast channel to a corresponding subsidiary channel and from the subsidiary channel to the broadcast channel, and wherein the interactive receiver device is configured to return play to the broadcast channel at one member of the group consisting of: multiple predetermined play positions within channel content, a content play position reached when leaving the channel and a current content play position, wherein said broadcast channel comprises a plurality of silent periods, each said silent period being a respective break in said broadcast content, said silent periods being respectively added to said broadcast channel, said silent periods providing an interval for subsequent playing of said subsidiary channel in addition to play of the broadcast channel, said digital instruction defining insertion of content of said subsidiary channel into said silent period, the inserting of said content of said subsidiary channel being at a time prior to a respective one of said silent periods and being carried out in response to a respective user carrying out said interaction in said predetermined manner and coinciding with a respective label, playing of said channel broadcast channel content being delayed to allow playing of said respectively inserted subsidiary channel content, said respective silent period providing additional time to allow said broadcast channel content to be played after said insertion of said subsidiary channel content.

22. The channel distributor of claim 21, wherein the distributor unit is configured to distribute subsidiary channels alongside a main channel for providing user selectable additional content.

23. The channel distributor of claim 22, wherein the digital instruction enables the user client to control content play to pass between two subsidiary channels of a shared main channel.

24. A channel distribution method implemented on an electronic processor, the method comprising:
receiving broadcast content of a broadcast content channel and presenting said broadcast content to a user;
providing a first interactive interface configured to obtain user indication of interest in specific content of said broadcast content, said interactive interface being active for a first predetermined amount of time;
upon receipt of said indicated interest within said predetermined amount of time, identifying the content;
providing to said user an identification of said content;
providing a second interface superimposed on play of said broadcast content, the second interface including an interactive link along with said identification, the interactive link comprising a digital instruction to provide additional information regarding said content upon interaction by said user;
upon receipt of said digital instruction, providing said additional information;
providing a plurality of silent periods, each said silent period being a respective break in said broadcast content, said silent periods being respectively added to said broadcast channel, said silent periods providing an interval for subsequent playing of said additional information in addition to play of the broadcast channel, said digital instruction defining insertion of said additional information into said silent period, the inserting of said additional information being at a time prior to a respective one of said silent periods and being carried out in response to a respective user providing said user indication and coinciding with a respective label, playing of said broadcast content being delayed to allow playing of said respectively inserted additional information, said respective silent period providing additional time to allow said broadcast content to be played after said insertion of said additional information.

25. The method of claim 24, wherein said content comprises musical content, and said identifying comprises identifying said musical content, said additional content being obtained based on said identifying.

26. The method of claim 25, wherein said identifying comprises obtaining a sample of said content, generating a signature from said sample, and submitting said signature to a music database for comparison in order to obtain said identification.

27. The method of claim 24, wherein said content is associated with a provider, said identifying comprises identifying said provider, and said additional information is made available from said provider.

* * * * *